3,262,918
PHOSPHORUS CONTAINING COPOLYMERS AND METHOD OF MAKING

John E. Herweh and Norman L. Miller, East Hempfield Township, Lancaster County, and Algirdas C. Poshkus, Lancaster, Pa., assignors to Armstrong Cork Company, Lancaster, Pa., a corporation of Pennsylvania
No Drawing. Filed Sept. 10, 1963, Ser. No. 307,804
5 Claims. (Cl. 260—78.5)

This invention relates to certain new copolymeric compositions containing phosphorus incorporated in the copolymer molecules and a method of making the same. It particularly concerns the products obtained by reacting neutral esters of trivalent phosphorus acids with copolymers containing anhydride groups.

We have found that neutral esters of trivalent phosphorus acids react with copolymers containing anhydride groups to give phosphorus-containing copolymeric compounds having fire-retardant properties and improved adhesion when used as film formers on materials such as glass. The polymeric resinous reaction products of this invention are adapted to a variety of uses such as the preparation of fire-retardant coating compositions and films, adhesive interliners or films for use in laminated glass sheets, molding compositions and other related uses.

The neutral esters of trivalent phosphorus acids with which this invention is concerned have the general formula $(RO)_{3-n}R'_nP$ where $n$ is a whole number of from 0 to 2. In the formula, R and R' are alkyl groups of from 1 to 7 carbon atoms and may be straight or branch chained. The reaction of this invention is general for alkyl phosphites, phosphonites, and phosphinites such as triethyl phosphite, diethyl phosphonite and ethyl diethyl phosphinite.

A wide variety of copolymers containing anhydride linkages may be modified in accordance with this invention. Thus, a variety of styrene-maleic anhydride copolymers and other olefin-maleic anhydride copolymers having anhydride units in the chain can be modified by reaction with the neutral esters of trivalent phosphorus acids. Examples of other anhydride group containing copolymers are the copolymers formed by reacting maleic anhydride with ethylene, stilbene, propylene, isobutylene or diisobutylene.

Generally speaking, the copolymer containing the anhydride groups is dissolved in the neutral ester of the trivalent phosphorus acid or in a mixture of the neutral ester of the trivalent phosphorus acid and a miscible non-reactive solvent for the polymer such as a trialkyl phosphate. The resulting reaction mixture is then heated at either the reflux temperature of the neutral ester or the reflux temperature of the miscible mixture for a period of time sufficient to react the neutral ester of the trivalent phosphorus acid with the anhydride groups. The unreacted neutral ester of the trivalent phosphorus acid, and the miscible non-reactive solvent, if used, is distilled, the still residue dissolved in a suitable solvent such as benzene, and the modified copolymer precipitated by the addition, with stirring, of a miscible solvent in which the polymer is insoluble such as petroleum ether.

The following examples will illustrate various ways in which the principle of our invention has been applied:

Example 1

92.94 grams of poly(methyl vinyl ether/maleic anhydride) copolymer resin, having the following recurring structural unit:

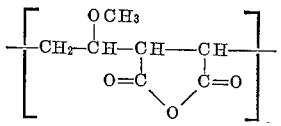

and having a specific viscosity of about 0.1 to 0.5[1], the average number of units in the copolymer molecules being about 8, was added to 294.1 grams of freshly distilled triethyl phosphite in a four-necked flask equipped with a condenser, thermometer, dropping funnel, and stirrer under a nitrogen atmosphere. After approximately 50% of the resin had been added, the reaction mixture was externally heated and the addition was completed. The reaction mixture was then heated with stirring at reflux (145° C. to 150° C.) for 16 hours. The resulting clear red reaction mixture was distilled at 37 to 38.5 mm. of pressure and 167 grams of triethyl phosphite was obtained. A portion, 6.5 grams, of still residue, a viscous deep red oil, was dissolved in hot benzene and precipitated by addition, with stirring, to cold petroleum ether. The orange-red product was filtered and dried in vacuum to give 6 grams of modified polymeric material having a melting point of 103° C. to 107.5° C. The material on reprecipitation a second time from benzene-petroleum ether gave 5.39 grams of a modified copolymer having a melting point of 132.5° C. to 136° C. The modified copolymer was soluble in ethyl acetate, benzene, tetrahydrofuran, dimethylformamide, methylene chloride, triethyl phosphite, and n-methylpyrolidone. On analysis for phosphorus, the modified copolymer contained 3.8% P. The molecular weight, determined cryoscopically in benzene, averaged 4105.

The major portion of the reaction mixture (202 grams) was dissolved in 310 ml. of hot benzene and precipitated by addition of 3 liters of cold petroleum ether. The product dried in vacuum gave 124 grams, M.P. 72° C. to 76° C. with softening at 62° C.

One gram of the triethyl phosphite modified copolymer and one-tenth of a gram of dibutyl phthalate plasticizer were dissolved in 4 grams of methylene chloride and the solution cast onto a glass plate. It evaporated to give a clear film having a yellowish cast which had excellent adhesion to the glass surface. The same solution, when used as an adhesive layer between two cleaned glass surfaces, showed excellent adhesion on drying.

The poly(methyl vinyl ether/maleic anhydride) copolymer resin in powdered form burned when subjected to the flame of a Bunsen burner and the unmodified resin supported combustion after the Bunsen flame was removed. The phosphite modified copolymer resin in a powdered form, when subjected to the flame of a Bunsen burner, melted but failed to burn or support combustion.

Example 2

166 grams of triethyl phosphite was added to a solution of 40.4 grams of a styrene-maleic anhydride copolymer resin, having the following recurring structural unit:

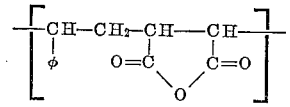

in 182 grams of triethyl phosphate. The copolymer resin had a specific viscosity of 0.67 centistoke at 30° C. and the average number of units in the copolymer molecules was from 12 to 13. The resulting clear, faintly yellow reaction mixture was heated at 150° to 160° C. under a nitrogen atmosphere for 39 hours. Unreacted phosphate and phosphite were distilled at a pressure of 3.5 to 1.5 mm. and a pot temperature of less than 100° C. Three hundred twenty-five grams of distillate was collected. The pot residue, 65 grams of a yellow crystalline gum, was triturated with light petroleum ether to remove low molecular weight phosphorus-containing compounds. After treatment with petroleum ether and drying in vac- ---
[1] Specific viscosity in centistokes determined on a 1% solution of the copolymer in MEK at 25° C.

uum, 53.6 grams of a light yellow powder remained which softened and melted at 80° C. to 100° C. The product was soluble in methylene chloride, benzene, and acetone; insoluble in hexane, petroleum ether and methanol. Cold concentrated hydrochloric acid softened the material, but did not dissolve it on heating. Warm aqueous alkali (20%) caused hydrolysis and part of the material dissolved. A white solid precipitated on acidifying with hydrochloric acid. The unmodified copolymer resin behaved similarly except that it was insoluble in benzene. Analysis for phosphorus: 4.6% P.

One gram of the modified copolymer resin and one-tenth gram of dibutyl phthalate were dissolved in 4 grams of methylene chloride and this solution was cast onto a glass plate to give a clear film having excellent adhesion to the glass surface on evaporation of the solvent. Again, the solution of the phosphite modified copolymer resin and plasticizer in the methylene chloride solvent formed a firm adhesive bond between two clean glass surfaces.

The unmodified copolymer resin burned when subjected to the flame of a Bunsen burner and supported combustion after the flame was removed as contrasted with the triethyl phosphite modified copolymer resin which did not burn but only melted when subjected to the flame of a Bunsen burner.

We claim:

1. A method of modifying an olefin-maleic anhydride copolymer containing anhydride groups in the copolymer chain which comprises reacting said copolymer with a neutral ester of a trivalent phosphorus acid of the formult $(RO)_{3-n}R'_nP$, where R and R' are alkyls of from 1 to 7 carbon atoms and where $n$ is a whole number of from 0 to 2.

2. A method in accordance with claim 1 in which said copolymer is reacted in a refluxing solution of a mixture of said neutral ester of a trivalent phosphorus acid and a trialkyl phosphate.

3. A flame-retardant copolymeric thermoplastic resin containing phosphorus incorporated in the resin molecules, said resin being obtained by reacting an olefin-maleic anhydride copolymer containing anhydride groups in the copolymer chain in a refluxing solution containing a neutral ester of a trivalent phosphorus acid of the formula $(RO)_{3-n}R'_nP$, where R and R' are alkyls of from 1 to 7 carbon atoms and where $n$ is a whole number of from 0 to 2.

4. A flame-retardant copolymeric thermoplastic resin containing phosphorus incorporated in the copolymer molecules, said resin being obtained by reacting a (methyl vinyl ether/maleic anhydride) copolymer having recurring structural units of the formula

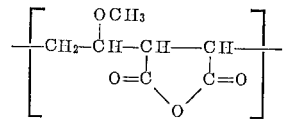

in a refluxing solution containing a neutral ester of a trivalent phosphorus acid of the formula $(RO)_{3-n}R'_nP$, where R and R' are alkyls of from 1 to 7 carbon atoms and where $n$ is a whole number of from 0 to 2.

5. A flame retardant copolymeric resin containing phosphorus incorporated in the copolymeric molecules, said resin being obtained by reacting a styrene-maleic anhydride copolymer having recurring structural units of the formula

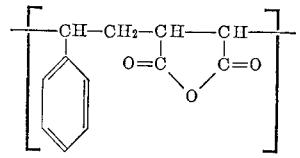

in a refluxing solution containing a neutral ester of a trivalent phosphorus acid of the formula $(RO)_{3-n}R'_nP$, where R and R' are alkyl groups of from 1 to 7 carbon atoms and where $n$ is a whole number of from 0 to 2.

References Cited by the Examiner

UNITED STATES PATENTS 3,196,190   7/1965   Nischk et al. _____ 260—869

JOSEPH L. SCHOFER, *Primary Examiner.*

L. WOLF, *Assistant Examiner.*